United States Patent
Cohen

(10) Patent No.: US 9,404,620 B2
(45) Date of Patent: Aug. 2, 2016

(54) REDUCING PRESSURE SPIKES DURING HYDROGEN DISPENSING

(71) Applicant: AIR PRODUCTS AND CHEMICALS, INC., Allentown, PA (US)

(72) Inventor: Joseph Perry Cohen, Bethlehem, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 129 days.

(21) Appl. No.: 14/501,169

(22) Filed: Sep. 30, 2014

(65) Prior Publication Data

US 2016/0091143 A1    Mar. 31, 2016

(51) Int. Cl.
 *F17C 13/00* (2006.01)
 *G05D 7/06* (2006.01)

(52) U.S. Cl.
 CPC ............ *F17C 13/002* (2013.01); *G05D 7/0635* (2013.01)

(58) Field of Classification Search
 CPC ......... F17C 13/00; F17C 13/002; G05D 7/00; G05D 7/0635
 USPC ......................... 141/1, 4, 192, 197; 137/87.04
 See application file for complete search history.

(56) References Cited

U.S. PATENT DOCUMENTS

| | | | | |
|---|---|---|---|---|
| 5,570,729 A * | 11/1996 | Mutter | .................... | F17C 5/007 141/11 |
| 7,568,507 B2 * | 8/2009 | Farese | ....................... | F17C 5/06 141/197 |
| 8,131,400 B2 * | 3/2012 | Smirnov | .............. | G05D 7/0635 137/2 |
| 8,365,777 B2 * | 2/2013 | Farese | ................... | F17C 13/026 141/4 |
| 8,534,327 B2 * | 9/2013 | Inagi | ......................... | F17C 5/06 141/197 |
| 2007/0295402 A1 * | 12/2007 | Awtar | ..................... | F01D 11/14 137/119.01 |
| 2010/0139777 A1 * | 6/2010 | Whiteman | .............. | F17C 5/007 137/14 |
| 2012/0132301 A1 | 5/2012 | Hobmeyr et al. | | |

FOREIGN PATENT DOCUMENTS

| | | |
|---|---|---|
| DE | 102011119077 A1 | 5/2012 |
| EP | 2 778 500 A1 | 9/2014 |
| WO | 03106888 A1 | 12/2003 |
| WO | 2013131519 A1 | 9/2013 |

* cited by examiner

*Primary Examiner* — Timothy L Maust
(74) *Attorney, Agent, or Firm* — Bryan C. Hoke, Jr.

(57) ABSTRACT

A method for lessening an initial pressure spike in a receiving tank caused by high pressure residual $H_2$-containing gas contained between a control valve and a block valve when dispensing the residual $H_2$-containing gas into the receiving tank. The block valve is briefly closed before the pressure in the transfer line decreases below a set pressure, thereby lessening the pressure spike in the receiving tank.

15 Claims, 4 Drawing Sheets

REDUCING PRESSURE SPIKES DURING HYDROGEN DISPENSING

BACKGROUND

There is growing interest to use hydrogen as a transportation fuel in cars, buses, trucks, and other vehicles. Hydrogen is generally stored in a fuel tank on-board the vehicles at high pressure. After most of the on-board hydrogen has been depleted, the pressure of the hydrogen in the fuel tank is reduced and the fuel tank must be refueled with hydrogen.

During refueling, hydrogen is dispensed into the fuel tank at a hydrogen dispensing station. The dispensing station includes a hydrogen supply, which can be one or more high pressure storage tanks. Hydrogen is transferred from the high pressure storage tank into the fuel tank. The driving force for transferring hydrogen is the pressure difference between the high pressure storage tank and the vehicle fuel tank.

The transfer line between the high pressure storage tank and the fuel tank typically includes block and bleed valves. A block valve blocks the flow from the high pressure storage tank and a bleed valve allows a portion of the hydrogen trapped between the block valve and the dispensing nozzle to discharge, thereby reducing the pressure at the dispensing nozzle. Accepted standards, such as SAE J2600 and ISO 17268, require that the pressure at the nozzle be less than 0.5 MPa (gauge) before the dispensing nozzle can be disconnected from the fueling receptacle on the vehicle.

While the transfer line between the block valve and the dispensing nozzle will be at a lower pressure after dispensing hydrogen to a vehicle, the residual hydrogen trapped in the transfer line between the control valve and the block valve will still be at high pressure.

When the next vehicle is connected for refueling, the block valve opens and the high pressure residual hydrogen rushes into the fuel tank. The fast transfer of the residual high pressure hydrogen into the fuel tank causes an undesirable pressure spike in the vehicle fuel system, a pressure spike that can be as high as 20 MPa. This pressure spike is associated with flow rates greater than 60 g/s, which is a flow rate limit defined by various component manufacturers. Exceeding this flow rate limit may lead to damage, for example, component erosion, check valve damage, and filter damage.

Industry desires to limit pressure spikes during hydrogen dispensing.

BRIEF SUMMARY

The present invention relates to a method for lessening an initial pressure spike in a receiving tank caused by high pressure residual $H_2$-containing gas contained between a control valve and a block valve when dispensing the residual $H_2$-containing gas into the receiving tank.

The residual $H_2$-containing gas has an initial pressure, $P_1$, and the receiving tank has an initial pressure, $P_2$, therein.

There are several aspects of the invention as outlined below. In the following, specific aspects of the invention are outlined. The reference numbers and expressions set in parentheses are referring to an example embodiment explained further below with reference to FIG. 1. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A method comprising, in sequence:
(a) opening the block valve (108) thereby allowing a first portion of the residual $H_2$-containing gas to flow through the block valve (108) into the receiving tank (118);
(b) closing the block valve (108) before the pressure of the residual $H_2$-containing gas that remains between the control valve (104) and the block valve (108) decreases below an intermediate pressure, $P_3$, wherein $$\frac{P_1 - P_3}{P_1 - P_2} < 0.2;$$

and
(c) opening the block valve (108) thereby allowing a second portion of the residual $H_2$-containing gas to flow through the block valve (108) into the receiving tank (118);
wherein the control valve (104) is kept closed throughout the sequence from (a) to (c).

Aspect 2. The method of aspect 1 wherein $$\frac{P_1 - P_3}{P_1 - P_2} < 0.15.$$

Aspect 3. The method of aspect 1 wherein $$\frac{P_1 - P_3}{P_1 - P_2} < 0.1.$$

Aspect 4. The method of any one of aspects 1 to 3 wherein subsequent to step (c) the method further comprises:
(d) closing the block valve (108) before the pressure of the residual $H_2$-containing gas that remains between the control valve (104) and the block valve (108) decreases below a second intermediate pressure, $P_4$, wherein $$\frac{P_1 - P_4}{P_1 - P_2} < 0.3;$$

and
(e) opening the block valve thereby allowing a third portion of the residual $H_2$-containing gas to flow through the block valve into the receiving tank;
wherein the control valve (104) is kept closed throughout the sequence from (a) to (e).

Aspect 5. The method of aspect 4 wherein $$\frac{P_1 - P_3}{P_1 - P_2} < 0.1 \text{ and } \frac{P_1 - P_4}{P_1 - P_2} < 0.2.$$

Aspect 6. The method of any one of the preceding aspects wherein the block valve (108) is closed in step (b) for at least 0.1 seconds prior to opening the block valve (108) in step (c) and/or block valve (108) is closed in step (d) of aspect 4 for at least 0.1 seconds prior to opening the block valve (108) in step (e).

Aspect 7. The method of any one of the preceding aspects wherein $P_1 > 60$ MPa.

Aspect 8. The method of any one of the preceding aspects further comprising:

sensing pressure representative of a pressure in the receiving tank (118) with a pressure sensor (116);
wherein the block valve (108) is closed in step (b) and/or in step (d) of aspect 4 responsive to a signal from the pressure sensor (116).

Aspect 9. The method of any one of the preceding aspects wherein the control valve is a pressure control valve.

The method of any one of the preceding aspects wherein $P_1 > 3P_2$ or wherein $P_1 > 5 P_2$.

Aspect 11. The method of any one of the preceding aspects wherein $P_1 - P_2 > 40$ MPa or wherein $P_1 - P_2 > 50$ MPa.

Aspect 12. The method of any one of the preceding aspects further comprising:
sensing pressure representative of a pressure of the residual $H_2$-containing gas contained between the control valve (104) and the block valve (108) with a pressure sensor (107) subsequent to opening the block valve (108) in step (a);
wherein the block valve (108) is closed in step (b) responsive to a signal from the pressure sensor (107) sensing the pressure representative of the pressure of the residual $H_2$-containing gas.

Aspect 13. The method of any one of the preceding aspects further comprising:
sensing pressure representative of a pressure of the residual $H_2$-containing gas contained between the control valve (104) and the block valve (108) with a pressure sensor (107) subsequent to opening the block valve (108) in step (c);
wherein the block valve (108) is closed in step (d) of aspect 4 responsive to a signal from the pressure sensor (107) sensing the pressure representative of the pressure of the residual $H_2$-containing gas.

Aspect 14. The method of any one of the preceding aspects further comprising:
providing a controller (120) operatively connected to the block valve (108);
wherein the controller (120) controls the opening and closing of the block valve (108).

Aspect 15. The method of the preceding aspect wherein the controller (120) is operatively disposed to receive signals from a pressure sensor (116) sensing pressure representative of a pressure in the receiving tank (118);
and wherein the controller (120) controls the opening and closing of the block valve (108) responsive to the signals from the pressure sensor (116) sensing the pressure representative of the pressure in the receiving tank (118).

Aspect 16. The method of aspect 14 or aspect 15 wherein the controller (120) is operatively disposed to receive signals from a pressure sensor (107) sensing pressure representative of a pressure of the residual $H_2$-containing gas contained between the control valve (104) and the block valve (108);
and wherein the controller (120) controls the opening and closing of the block valve (108) responsive to the signals from the pressure sensor (107) sensing the pressure representative of the pressure of the residual $H_2$-containing gas.

Aspect 17. The method of aspect 14 furthermore comprising:
sensing a pressure representative of the initial pressure, $P_1$, of the residual $H_2$-containing gas with a first pressure sensor (107) before opening the block valve (108) in step (a);

sensing a pressure representative of the initial pressure, $P_2$, in the receiving tank (118) with a second pressure sensor (116) before opening the block valve (108) in step (a); and
sensing pressure representative of the residual $H_2$-containing gas with the first pressure sensor (107) while allowing the first portion of the residual $H_2$-containing gas to flow through the block valve (108);
wherein the controller (120) is operatively connected to the first pressure sensor (107) and the second pressure sensor (116) and controls closing of the block valve (108) in step (b) responsive to the pressure sensed by the first pressure sensor (107) subsequent to opening the block valve (108) in step (a) and/or controls closing of the block valve (108) in step (d) of aspect 4 responsive to the pressure sensed by the first pressure sensor (107) subsequent to opening the block valve (108) in step (c).

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

The term "plurality" means "two or more than two."

The phrase "at least a portion" means "a portion or all."

As used herein, "first," "second," "third," etc. are used to distinguish from among a plurality of steps and/or features, and is not indicative of the total number, or relative position in time and/or space unless expressly stated as such.

As used herein, "in fluid flow communication" means operatively connected by one or more conduits, manifolds, valves and the like, for transfer of fluid. A conduit is any pipe, tube, passageway or the like, through which a fluid may be conveyed. An intermediate device, such as a pump, compressor or vessel may be present between a first device in fluid flow communication with a second device unless explicitly stated otherwise.

For the purposes of simplicity and clarity, detailed descriptions of well-known devices, circuits, and methods are omitted so as not to obscure the description of the present invention with unnecessary detail.

As used herein, pressures are gauge pressures unless explicitly stated otherwise.

Figure 1:
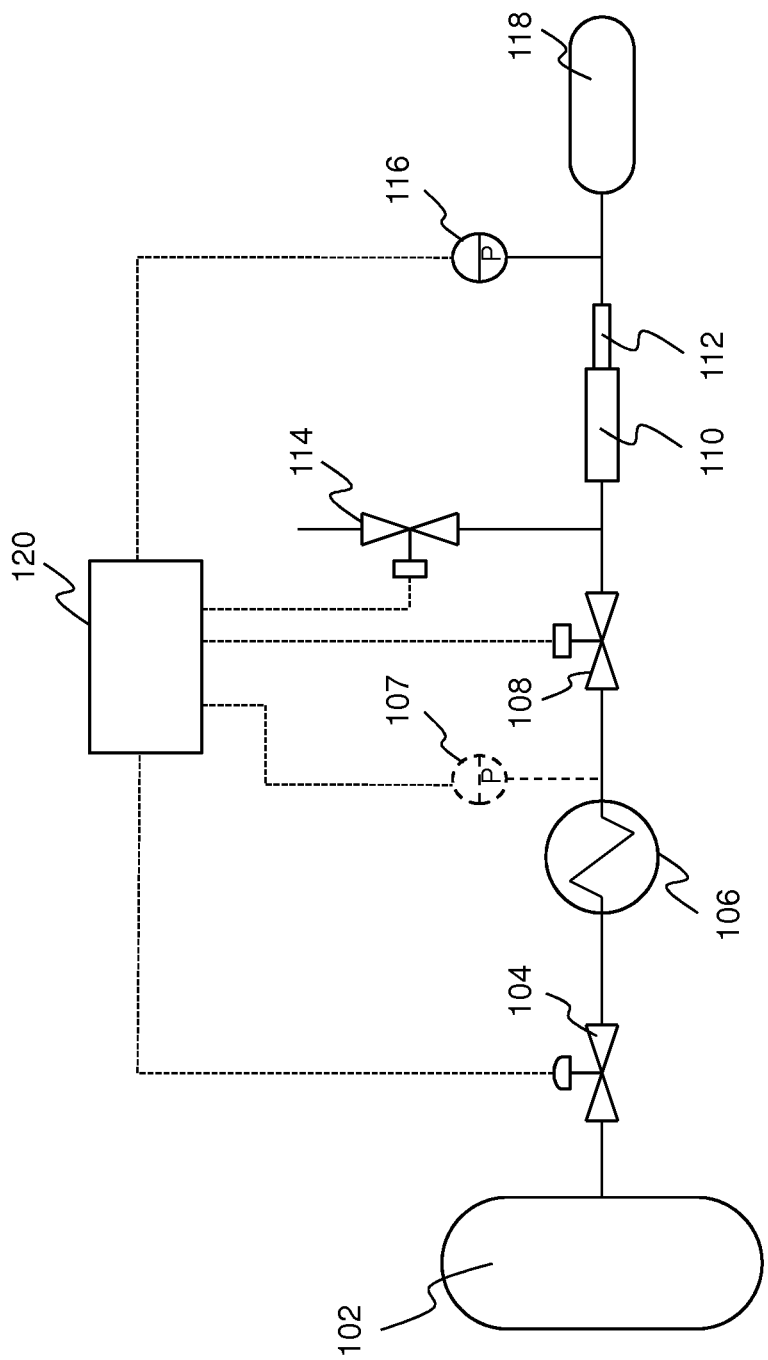
FIG. 1 is a process flow diagram for a dispensing station and receiving tank.

FIG. 1 is a process flow diagram for describing the method. The process flow diagram includes the dispensing station and the receiving tank on a vehicle.

The hydrogen dispensing station comprises one or more hydrogen storage tanks 102. The one or more hydrogen storage tanks can be any hydrogen storage tanks known in the field. The one or more hydrogen storage tanks may include a plurality of storage tanks suitable for cascade filling.

The hydrogen dispensing station comprises a control valve 104 operatively connected to the one or more storage tanks 102 via a transfer conduit. Control valve 104 may be a pressure control valve. Control valve 104 controls the rate of transferring hydrogen from the one or more storage tanks 102 to the receiving tank 118 of the vehicle. The control valve 104 is operatively connected to the controller 120 and receives control signals from controller 120.

The hydrogen dispensing station may comprise a heat exchanger 106 operatively connected to the control valve 104 via a transfer conduit. Heat exchanger 106 cools the hydrogen as it is being dispensed from the one or more storage tanks 102 to the receiving tank 118. The heat exchanger 106 may include a thermal ballast (thermal capacitor) such as an aluminum block as known from US 2008/0185068.

The hydrogen dispensing station comprises a block valve 108 and a bleed valve 114 operatively connected to the control valve 104 via a transfer conduit. The block valve 108 in combination with the bleed valve 114 are used to reduce the pressure in the dispensing nozzle 110 prior to disconnecting the dispensing nozzle 110 from the receptacle 112 of the vehicle as is known in the art of hydrogen fueling.

A block valve is any valve that is capable of blocking the flow in both directions. Any suitable block valve known in the art of hydrogen fueling may be used.

The hydrogen dispensing station may comprise an optional pressure sensor 107 operatively located between the control valve 104 and the block valve 108.

The hydrogen dispensing station comprises a dispensing nozzle 110 operatively connected to the block valve 108. The dispensing nozzle 110 can be any dispensing nozzle known in the art for hydrogen fuelling.

The hydrogen dispensing station comprises a controller 120 operatively connected to the control valve 104, the block valve 108, the bleed valve 114, and optionally, the pressure sensor 107 and the pressure sensor 116 (described later). The controller may be a computer, process logic controller (PLC), or the like. Controllers are ubiquitous in the art of hydrogen dispensing.

The vehicles comprise a receiving tank 118, an optional pressure sensor 116, and a receptacle 112. Receptacle 112 is suitable for providing a sealing connection with the dispensing nozzle 110.

Prior to the dispensing process, the dispensing nozzle 110 is connected to the receptacle 112 of the vehicle. During the dispensing process, a $H_2$-containing gas is passed from the one or more storage tanks 102 to the receiving tank 118 of a vehicle. The flow rate of the $H_2$-containing gas is controlled using control valve 104, which may be a pressure control valve. The $H_2$-containing gas is cooled in heat exchanger 106, and passed through block valve 108 to the dispensing nozzle 110, where the $H_2$-containing gas is transferred to the vehicle via the receptacle 112.

After the receiving tank 118 reaches a target pressure, the flow is stopped by closing block valve 108. Then the pressure in the transfer line between block valve 108 and the dispensing nozzle 110 is reduced by bleeding off at least a portion of the residual gas in the transfer line via bleed valve 114. When the pressure at the dispensing nozzle is sufficiently reduced, the dispensing nozzle is disconnected from the receptacle 112.

After filling the first receiving tank, a high pressure residual $H_2$-containing gas is contained between the control valve 104 and the block valve 108. In order to prevent $H_2$-containing gas losses, this residual $H_2$-containing gas is not vented. The pressure in the transfer line may be measured by optional pressure sensor 107.

When a second vehicle arrives for refueling, the dispensing nozzle is connected to the receptacle 112 of the second vehicle. Before this invention, block valve 108 would open and the residual $H_2$-containing gas would rush into the receiving tank 118 of the second vehicle causing a pressure spike in the vehicle fueling system.

After the pressure in the transfer line and the receiving tank 118 of the second vehicle equilibrates, control valve 104 opens to dispense the $H_2$-containing gas into the receiving tank 118 of the second vehicle.

According to the present method, block valve 108 closes before the all of the residual $H_2$-containing gas is passed to the receiving tank of the second vehicle.

After dispensing to the first vehicle, the residual $H_2$-containing gas contained between the control valve 104 and the block valve 108 has an initial pressure, $P_1$. $P_1$ may be greater than 60 MPa.

The $H_2$-containing gas in the receiving tank 118 of the second vehicle that needs to be refueled has an initial pressure, $P_2$. $P_2$ may be less than 10 MPa (gauge) or less than 5 MPa (gauge).

The method comprises step (a): opening block valve 108 while keeping control valve 104 closed, thereby allowing a first portion of the residual $H_2$-containing gas to flow through block valve 108 and into receiving tank 118 of the second vehicle.

The method comprises step (b): closing block valve 108 before the pressure of the residual $H_2$-containing gas that remains between the control valve 104 and the block valve 108 decreases below an intermediate pressure $P_3$, where $$\frac{P_1 - P_3}{P_1 - P_2} < 0.2 \text{ or } \frac{P_1 - P_3}{P_1 - P_2} < 0.15 \text{ or } \frac{P_1 - P_3}{P_1 - P_2} < 0.1.$$

Block valve 108 is closed before the pressure in the transfer line is less than $P_3$.

The pressure of the residual $H_2$-containing gas in the transfer line between control valve 104 and the block valve 108 may be measured by optional pressure sensor 107 and closing of the block valve 108 responsive to signals from the pressure sensor 107. However, the method does not require that the pressure in the transfer line be measured. For example, experiments could be conducted to determine the timing of opening and closing the block valve 108 in order to effect the desired pressure in the transfer line.

The method comprises (c): opening block valve 108 thereby allowing a second portion of the residual $H_2$-containing gas to flow through block valve 108 into receiving tank 118.

Block valve 108 may be closed, for example, for at least 0.1 seconds prior to opening the block valve in step (c).

Block valve 108 may be closed one or more times before the residual $H_2$-containing gas is passed to the receiving tank 118 of the second vehicle.

Subsequent to step (c), the method may further comprise step (d): closing block valve 108 before the pressure of the residual $H_2$-containing gas that remains between control valve 104 and block valve 108 decreases below a second intermediate pressure, $P_4$, where $$\frac{P_1 - P_4}{P_1 - P_2} < 0.3,$$

and step (e): opening the block valve thereby allowing a third portion of the residual $H_2$-containing gas to flow through the block valve 108 into the receiving tank 118. In step (d) block valve 108 is closed before the pressure in the transfer line is less than $P_4$. Block valve 108 may be closed in step (d) for at least 0.1 seconds prior to opening block valve 108 in step (e).

In an embodiment, $$\frac{P_1 - P_3}{P_1 - P_2} < 0.1 \text{ and } \frac{P_1 - P_4}{P_1 - P_2} < 0.2.$$

The method may comprise some feedback control based on the pressure in receiving tank 118. The method may further comprise sensing a pressure representative of a pressure in the receiving tank with pressure sensor 116, and block valve 108 may be closed in step (b) and/or step (d) responsive to a signal from pressure sensor 116.

The pressure in the receiving tank may be measured in a conduit in fluid flow communication with the receiving tank 118 as shown, or measured in the receiving tank 118 itself. A pressure sensor in the receiving tank may communicate with the controller 120 via wireless communications (e.g. IR).

Figure 2:
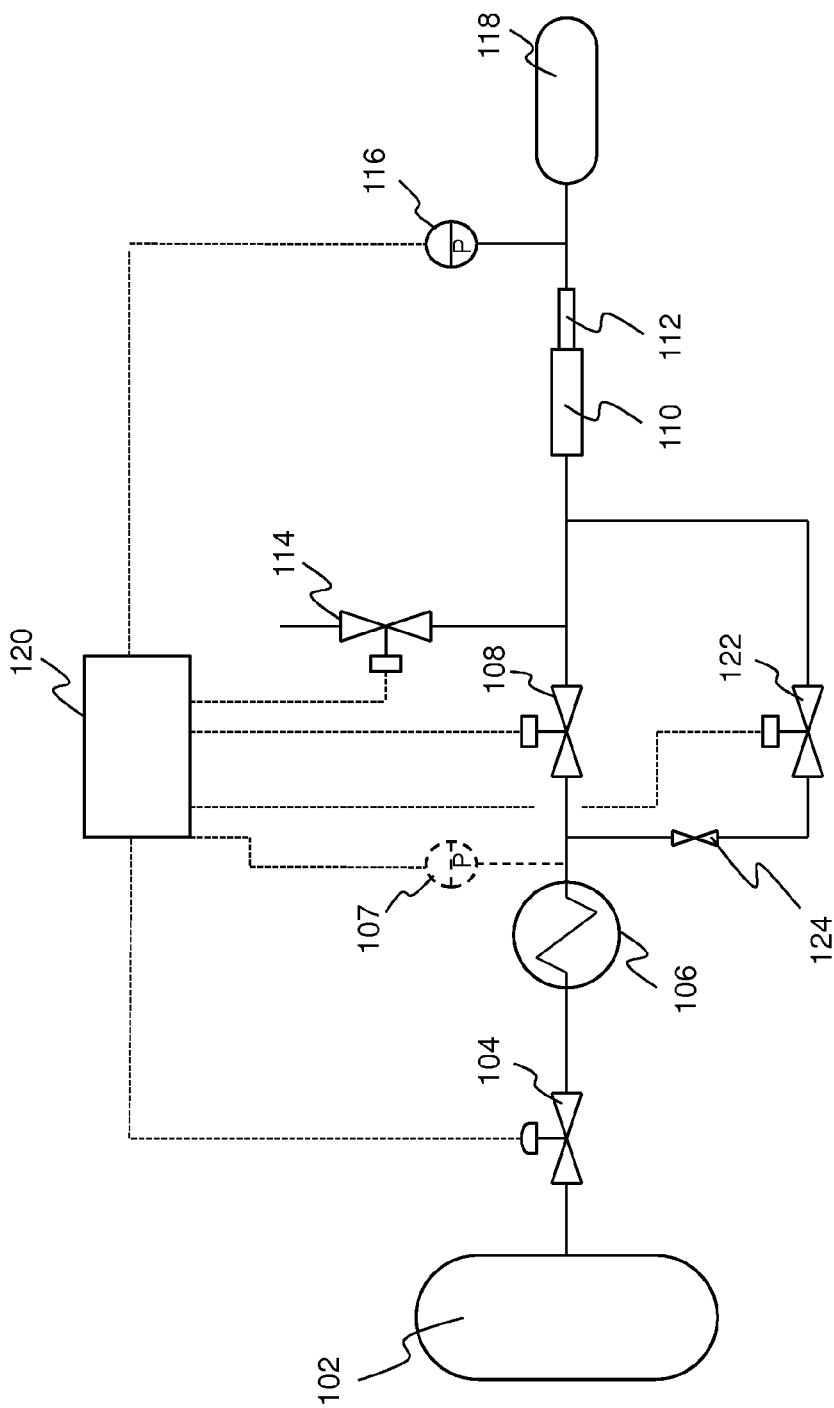
FIG. 2 is a process flow diagram for a dispensing station and receiving tank with flow restriction.

An alternative solution to the pressure spike problem is shown in FIG. 2.

FIG. 2 is similar to FIG. 1 with the addition of a flow restriction 124, e.g. an orifice, and block valve 122. Reference numbers for features used in FIG. 1 apply similarly to FIG. 2.

In the alternative solution, block valve 122 is opened and the high pressure residual $H_2$-containing gas is throttled through flow restriction 124 thereby limiting the pressure spike as the residual $H_2$-containing gas is passed to the receiving tank 118.

The issue with this solution is that $H_2$ has a reverse Joule-Thompson effect, and the residual $H_2$-containing gas will warm significantly as it passes through the flow restriction 124 and add heat to receiving tank 118.

Examples

Figure 3:
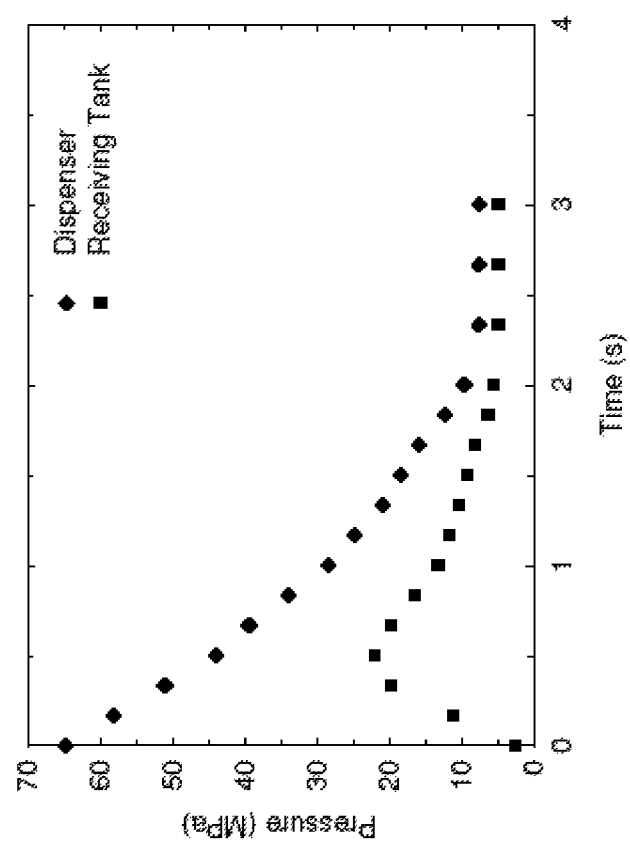
FIG. 3 is a graph of pressure versus time for dispensing without closing the block valve during the initial release of the residual $H_2$-containing gas.
Figure 4:
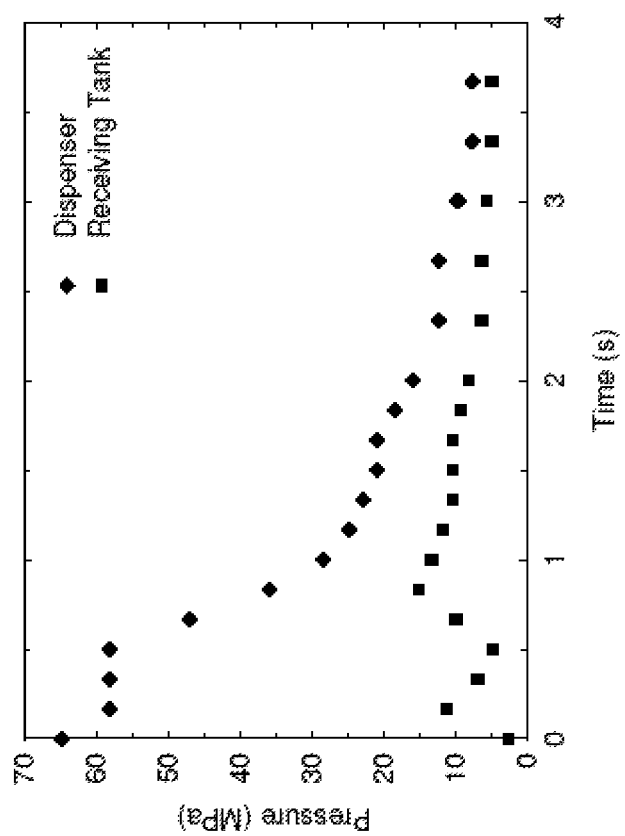
FIG. 4 is a graph of pressure versus time for dispensing where the block valve is closed during the initial release of the residual $H_2$-containing gas.

The effect of closing the block valve 108 during the initial release of the residual $H_2$-containing gas is shown in FIG. 3 and FIG. 4.

FIG. 3 shows the pressure of the residual $H_2$-containing gas in the dispenser (between the control valve 104 and the block valve 108) as a function of time and the associated pressure of the $H_2$-containing gas in the receiving tank 118 as a function of time. The initial pressure in the dispenser is 65 MPa and the initial pressure in the receiving tank is 2.5 MPa. In FIG. 3, the block valve 108 is simply opened thereby allowing the pressure to equalize between the dispenser and the receiving tank.

As shown in FIG. 3, the pressure in the receiving tank spikes to a pressure of about 22 MPa within the first second of opening the block valve 108. This pressure spike is undesirable.

FIG. 4 shows the pressure of the residual $H_2$-containing gas in the dispenser (between the control valve 104 and the block valve 108) as a function of time and the associated pressure of the $H_2$-containing gas in the receiving tank 118 as a function of time. The initial pressure in the dispenser is 65 MPa and the initial pressure in the receiving tank is 2.5 MPa. In FIG. 4, the block valve 108 is briefly closed when the pressure in the dispenser is reduced to about 58 MPa and then reopened thereby allowing the pressure to equalize between the dispenser and the receiving tank.

As shown in FIG. 4, the pressure in the receiving tank spikes to a pressure of about 11 MPa within the first second of opening the block valve 108 and later spikes to a pressure of about 15 MPa. This example clearly shows that the pressure spike is reduced according to the present method.

The invention claimed is:

1. A method for lessening an initial pressure spike in a receiving tank caused by residual $H_2$-containing gas contained between a control valve and a block valve when dispensing the residual $H_2$-containing gas into the receiving tank, the residual $H_2$-containing gas having an initial pressure, $P_1$, and the receiving tank having an initial pressure, $P_2$, therein, the method comprising, in sequence:
  (a) opening the block valve thereby allowing a first portion of the residual $H_2$-containing gas to flow through the block valve into the receiving tank;
  (b) closing the block valve before the pressure of the residual $H_2$-containing gas that remains between the control valve and the block valve decreases below an intermediate pressure, $P_3$, wherein $$\frac{P_1 - P_3}{P_1 - P_2} < 0.2;$$

and
  (c) opening the block valve thereby allowing a second portion of the residual $H_2$-containing gas to flow through the block valve into the receiving tank;
  wherein the control valve is kept closed throughout the sequence from (a) to (c).

2. The method of claim 1 wherein $$\frac{P_1 - P_3}{P_1 - P_2} < 0.15.$$

3. The method of claim 1 wherein $$\frac{P_1 - P_3}{P_1 - P_2} < 0.1.$$

4. The method of claim 1 wherein subsequent to step (c) the method further comprises:
(d) closing the block valve before the pressure of the residual H$_2$-containing gas that remains between the control valve and the block valve decreases below a second intermediate pressure, P$_4$, wherein $$\frac{P_1 - P_4}{P_1 - P_2} < 0.3;$$

and
(e) opening the block valve thereby allowing a third portion of the residual H$_2$-containing gas to flow through the block valve into the receiving tank;
wherein the control valve (104) is kept closed throughout the sequence from (a) to (e).

5. The method of claim 4 wherein $$\frac{P_1 - P_3}{P_1 - P_2} < 0.1 \text{ and } \frac{P_1 - P_4}{P_1 - P_2} < 0.2.$$

6. The method of claim 1 wherein the block valve is closed in step (b) for at least 0.1 seconds prior to opening the block valve in step (c).

7. The method of claim 1 wherein P$_1$>60 MPa.

8. The method of claim 1 further comprising:
sensing pressure representative of a pressure in the receiving tank with a pressure sensor;
wherein the block valve is closed in step (b) responsive to a signal from the pressure sensor.

9. The method of claim 1 wherein the control valve is a pressure control valve.

10. The method of claim 1 wherein P$_1$>3 P$_2$ or wherein P$_1$>5 P$_2$.

11. The method of claim 1 further comprising:
sensing pressure representative of a pressure of the residual H$_2$-containing gas contained between the control valve and the block valve with a pressure sensor subsequent to opening the block valve in step (a);
wherein the block valve is closed in step (b) responsive to a signal from the pressure sensor sensing the pressure representative of the pressure of the residual H$_2$-containing gas.

12. The method of claim 1 further comprising:
providing a controller operatively connected to the block valve;
wherein opening and closing of the block valve is controlled by the controller.

13. The method of claim 12 wherein
the controller is operatively disposed to receive signals from a pressure sensor sensing pressure representative of a pressure in the receiving tank;
and wherein the controller controls the opening and closing of the block valve responsive to the signals from the pressure sensor sensing the pressure representative of the pressure in the receiving tank.

14. The method of claim 12 wherein:
the controller is operatively disposed to receive signals from a pressure sensor sensing pressure representative of a pressure of the residual H$_2$-containing gas contained between the control valve and the block valve;
and wherein the controller controls the opening and closing of the block valve responsive to the signals from the pressure sensor sensing the pressure representative of the pressure of the residual H$_2$-containing gas.

15. The method of claim 12 furthermore comprising:
sensing a pressure representative of the initial pressure, P$_1$, of the residual H$_2$-containing gas with a first pressure sensor before opening the block valve in step (a);
sensing a pressure representative of the initial pressure, P$_2$, in the receiving tank with a second pressure sensor before opening the block valve in step (a); and
sensing pressure representative of the residual H$_2$-containing gas with the first pressure sensor while allowing the first portion of the residual H$_2$-containing gas to flow through the block valve;
wherein the controller is operatively connected to the first pressure sensor and the second pressure sensor and controls closing of the block valve in step (b) responsive to the pressure sensed by the first pressure sensor subsequent to opening the block valve in step (a).

* * * * *